(12) United States Patent
Haluptzok et al.

(10) Patent No.: US 7,379,596 B2
(45) Date of Patent: May 27, 2008

(54) SYSTEM AND METHOD FOR PERSONALIZATION OF HANDWRITING RECOGNITION

(75) Inventors: Patrick Haluptzok, Sammamish, WA (US); Ross Nathaniel Luengen, Sammamish, WA (US); Benoit J. Jurion, Seattle, WA (US); Michael Revow, Bellevue, WA (US); Richard Kane Sailor, Brier, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 10/693,259

(22) Filed: Oct. 24, 2003

(65) Prior Publication Data

US 2005/0089227 A1 Apr. 28, 2005

(51) Int. Cl.
*G06K 9/18* (2006.01)
(52) U.S. Cl. .................. 382/186; 382/187; 382/188; 382/229; 345/156; 345/173
(58) Field of Classification Search ........... 382/186, 382/187, 189, 190, 188, 229; 345/156, 173
See application file for complete search history.

(56) References Cited

U.S. PATENT DOCUMENTS

| | | | | |
|---|---|---|---|---|
| 5,319,721 A | * | 6/1994 | Chefalas et al. | 382/160 |
| 5,630,168 A | * | 5/1997 | Rosebrugh et al. | 710/5 |
| 5,710,832 A | * | 1/1998 | Berman et al. | 382/189 |
| 6,363,348 B1 | * | 3/2002 | Besling et al. | 704/270.1 |
| 6,484,136 B1 | * | 11/2002 | Kanevsky et al. | 704/9 |
| 2003/0190074 A1 | * | 10/2003 | Loudon et al. | 382/187 |

* cited by examiner

*Primary Examiner*—Matthew C. Bella
*Assistant Examiner*—Mike Rahmjoo
(74) *Attorney, Agent, or Firm*—Workman Nydegger

(57) ABSTRACT

An improved system and method for personalizing recognition of an input method is provided. A trainable handwriting recognizer may be personalized by using ink written by the user and text authored by the user. The system includes a personalization service engine and a framework with interfaces for collecting, storing, and accessing user ink and authored information for training recognizers. The trainers of the system may include a text trainer for augmenting a recognizer's dictionary using text content and a shape trainer for tuning generic recognizer components using ink data supplied by a user. The trainers may load multiple trainer clients, each capable of training one or more specific recognizers. Furthermore, a framework is provided for supporting pluggable trainers. Any trainable recognizer may be dynamically personalized using the harvested information authored by the user and ink written by the user.

29 Claims, 5 Drawing Sheets

SYSTEM AND METHOD FOR PERSONALIZATION OF HANDWRITING RECOGNITION

FIELD OF THE INVENTION

The invention relates generally to computer systems, and more particularly to an improved system and method for personalization of handwriting recognition.

BACKGROUND OF THE INVENTION

Advanced input methods such as handwriting, speech, and Input Method Editors (IMEs) may use generic input samples for training their recognizers. For instance, a handwriting recognizer may be trained by collecting writing samples donated by a randomly selected group. Such a method of training a recognizer has the advantage that the recognizer is tuned to work for as many people as possible. The more samples collected from different people used to train the recognizer, the more robust the recognizer may become for general use.

However, such a method for training a recognizer has several disadvantages. Because the recognizer is trained by generic writing samples, an individual user may experience recognition errors, especially when the user writes a character that looks like another character obtained from the generic samples. For example, a user may write the letter "u" as the letter "n" from the generic samples. Unless the user is able to modify their handwriting to adapt to the recognizer trained by generic samples, the user may not have the ability to fix such recognition errors. The user may only be provided the ability to correct such an error by correcting the text translation of an individual word containing the error, such as correcting the text translation from "yon" by "you". But this may not fix the underlying recognition error of misrecognizing a particular input character. Correcting each misrecognized word may be painful for the user especially when the same errors are repeated and the recognizer doesn't appear to learn the nuances of the shape in an individual's writing from these corrections.

Advanced input methods may also provide a generic language model used to train their recognizers. This language model may not use the vocabulary unique to the user. Moreover, some key sources of a user's vocabulary such as emails, documents, and URLs authored by the user may not be represented in the generic language model. For example, email addresses do not conform to the language rules or vocabulary of a specific language. English language rules which require, for example, a space between words do not apply to an email address. Similarly, a Uniform Resource Locator (URL) does not conform to the language rules or vocabulary of a specific language. As a result, a generic language model is limited in its ability to accurately recognize these types of input. A user consequently may have an unsatisfactory experience when using a generic language model that results in poor recognition accuracy for these types of input.

What is needed is a way for advanced input methods to be made aware of how an individual user writes and what an individual user writes so that higher accuracy in recognition of input may be achieved. Additionally, such a system should support dynamic adaptation of a recognizer as a user writes to the system and authors text.

SUMMARY OF THE INVENTION

Briefly, the present invention provides an improved system and method for personalization of handwriting recognition. The system and method may personalize a trainable recognizer by using ink written by-a user and text authored by a user. To this end, the present invention provides components and a framework with interfaces for collecting, storing, and accessing user ink and authored information for training recognizers. Among the components provided may be a personalization service engine operably coupled to various applications, databases and storage facilities, recognizers, and trainers for recognizers.

The personalization service engine may include personalization service interfaces, an ink service engine, a harvesting service engine, and a trained data engine. The ink service engine may receive ink from collectors and store collected ink in an ink database. The harvesting 'service engine may collect text authored by a user and store the collected text in a harvesting service database. Furthermore, the framework provided by the present invention allows any application or executable code to supply a user's ink or authored text to improve recognition accuracy. Such applications may include a personalization wizard, an ink viewer, and other applications. Included in the databases and storage facilities may be an ink database for storing a user's ink, a trained data database for storing trained data used by a recognizer, a registry for storing operating system and program settings, a harvest service database for storing language information, and disk storage generally used by the computer system.

Advantageously, the trainers may include a text-trainer for augmenting a recognizer's dictionary using text content and a shape trainer for tuning generic recognizer components using ink data supplied by a user. The trainers may load multiple trainer clients, each capable of training one or more specific recognizers. Furthermore, by providing a framework for supporting pluggable trainers, any trainable recognizer may be dynamically personalized using the harvested information authored by the user and ink written by the user.

The architecture of the present invention may allow a personalization service engine to automatically collect a user's ink and authored text to create a repository of user data for personalizing recognition. Furthermore, the architecture supports dynamic adaptation of a trainable recognizer as a user writes to the system and authors text. Other advantages will become apparent from the following detailed description when taken in conjunction with the drawings, in which:

DETAILED DESCRIPTION

Exemplary Operating Environment

Figure 1:
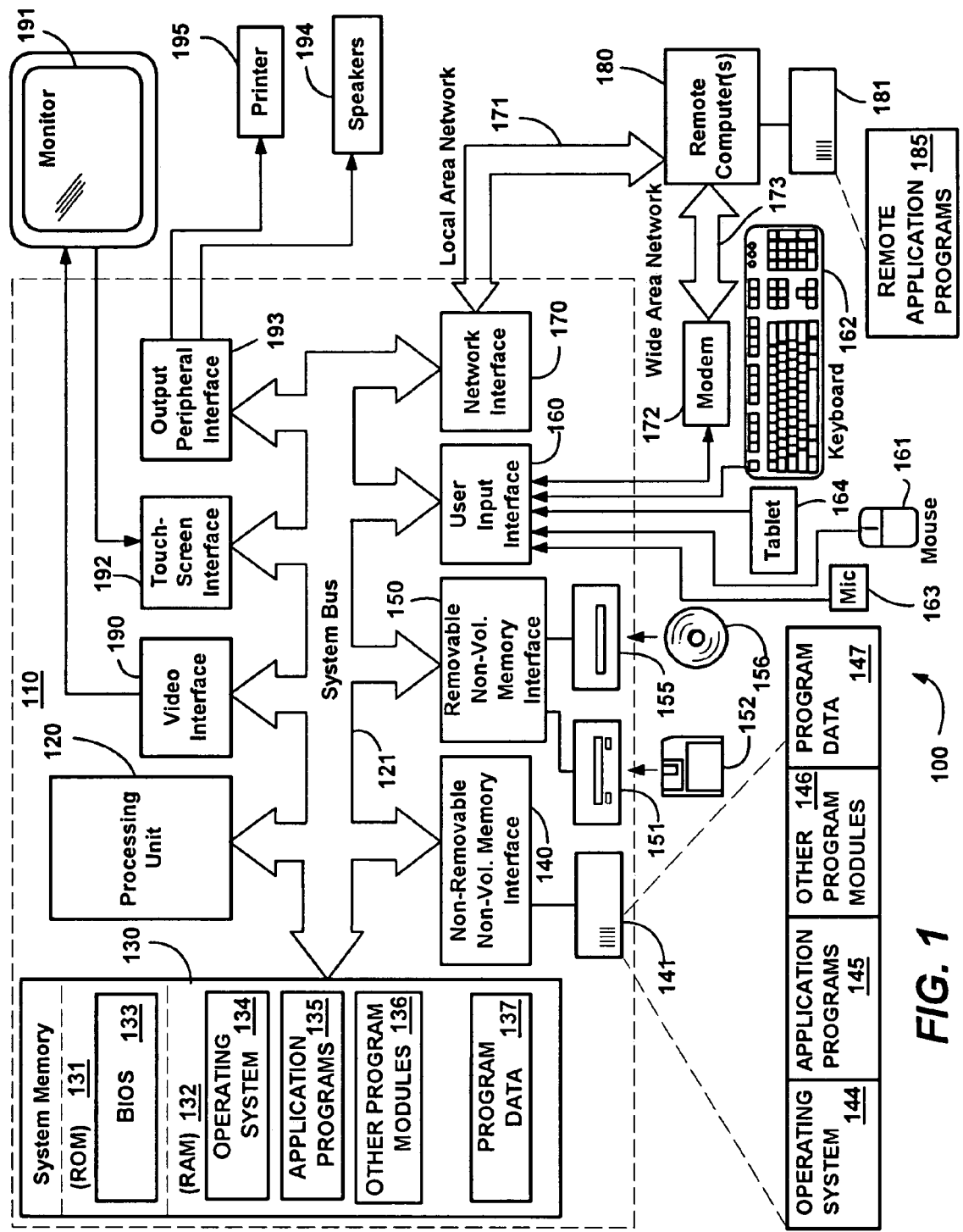
FIG. 1 is a block diagram generally representing a computer system into which the present invention may be incorporated.

FIG. 1 illustrates an example of a suitable computing system environment 100 on which the invention may be implemented. The computing system environment 100 is only one, example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media-includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing,the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other-removable/non-removable, volatile/nonvolatile computer storage media that can be used in the exemplary operating environment include, but are not limited to, magnetic tape cassettes, flash memory cards, digital versatile disks, digital video tape, solid state RAM, solid state. ROM and the like. The hard disk drive 141 is typically connected to the system bus 121 through a non-removable, memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Personalization of Handwriting Recognition

The present invention is generally directed towards a system and method for personalization of handwriting recognition. The system and method may personalize a trainable recoqnizer by using ink written by the user and text authored by the user. By tailoring the recognizer for how a user writes and for what a user writes, a recognizer may be more accurate in recognizing a user's handwriting. To this end, the present invention provides components and a framework with interfaces for collecting, storing, and accessing user ink and authored information for training recognizers. As used herein, ink generally means written character shapes or words. A trainable recognizer may be personalized explicitly or implicitly. As used herein, implicit personalization means training a recognizer with a user's ink collected without user supplied text or with text automatically collected from the user's machine. Explicit personalization means training a recognizer with a user's ink collected with text supplied by the user.

As will be seen, the architecture of the present invention allows a personalization service engine to automatically collect a user's ink and authored text to create a repository of user data for personalizing recognition. In general, user data as used herein means data authored by the user, including text authored by the user, the user's ink and associated text or text normally authored by the user, which may be a recognition result or user provided text, and may also include context information about data authored by the user, such as the source application that captured the ink, correction context, name of a document, etc. The present invention also provides a framework with interfaces for any application or executable code to supply a user's ink or authored text to improve recognition accuracy. Furthermore, by providing a corresponding pluggable trainer, any trainable recognizer may be dynamically personalized using the harvested information authored by the user and ink written by the user. As will be understood, the various block diagrams, flow charts and scenarios described herein are only examples, and there are many other scenarios to which the present invention will apply.

Figure 2:
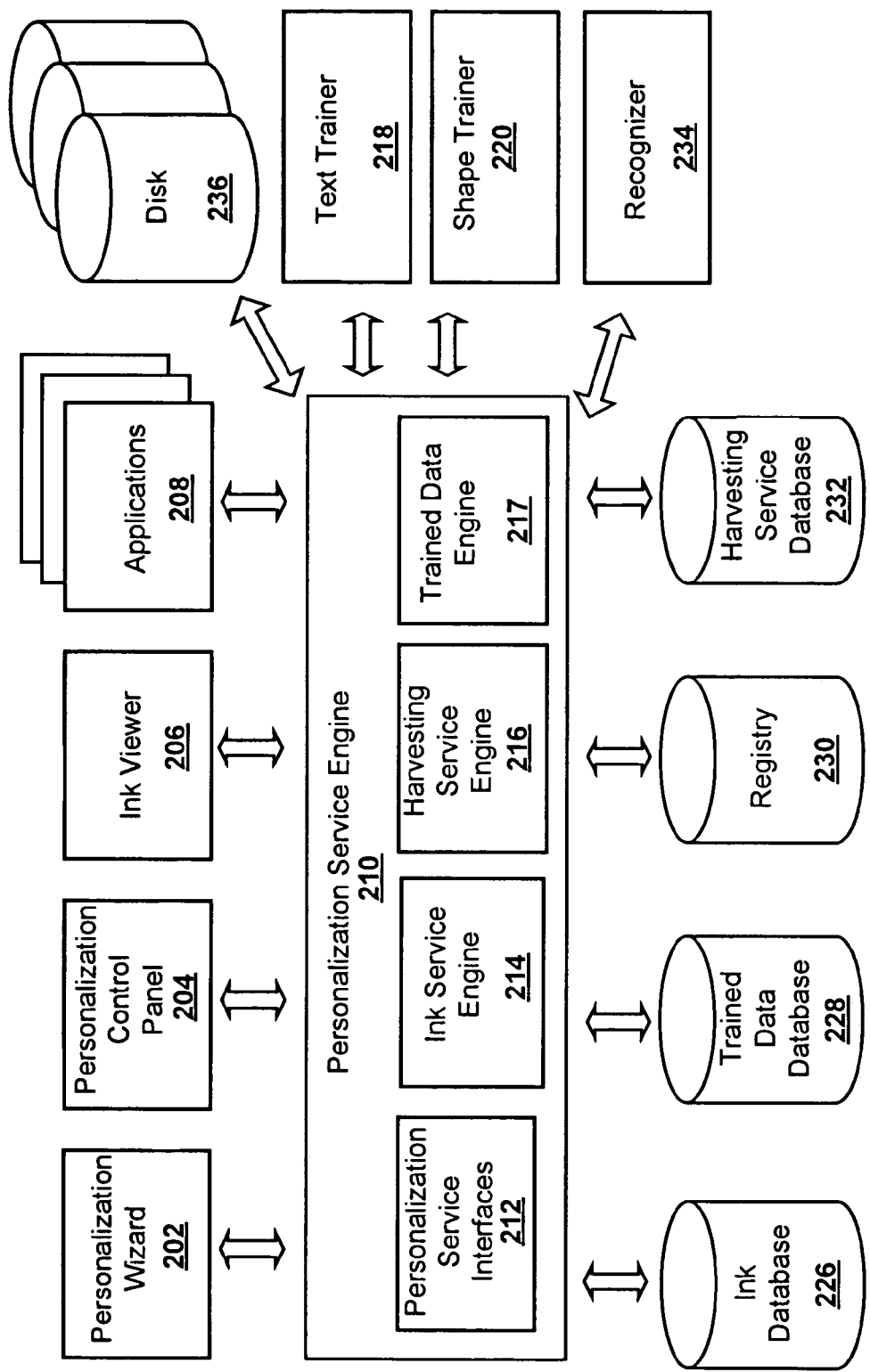
FIG. 2 is a block diagram generally representing an exemplary architecture of system components for personalization of handwriting recognition, in accordance with an aspect of the present invention.

Turning to FIG. 2 of the drawings, there is shown a block diagram generally representing an exemplary architecture of system components for personalization of handwriting recognition. Those skilled in the art will appreciate that the functionality implemented within the blocks illustrated in the diagram may be implemented as separate components or the functionality of several or all of the blocks may be implemented within a single component. As an example, the functionality of the harvesting service engine 216 in the personalization service engine 210 may be implemented in a separate component. Or the functionality of the ink viewer 206 may be included in the personalization control panel 204, or the functionality of the personalization control panel 204 may be included in the personalization wizard 202.

The personalization service engine 210 shown in FIG. 2 may include personalization service interfaces 212, an ink service engine 214, a harvesting service engine 216, and a trained data engine 217 for storing trained data from trainer clients. The personalization service engine 210 may be any executable software code including a kernel component, an application component, a component of a linked library, an object, and so forth. The personalization service interfaces 212 may be an application programming interface (API), an object, a control or other executable code. The personalization service interfaces 212 may provide access to add, delete, or query of the user's ink and associated data by including invocable interfaces such as QueryInk and EnumerateInk to retrieve a user's ink form the ink database 226 and AddInk to add a user's ink to the ink database 226. The personalization service interfaces 212 may provide access to set and get personalization settings to and from the registry 230 by including invocable interfaces such as Set and Get. The personalization service interfaces 212 may also provide access to train and load trained data by including invocable interfaces such as Train for training data and GetTrainedData to load trained data from the trained data database 228. The ink service engine 214 may be any executable software code including a kernel component, an application component, a component of a linked library, an object, and so forth. The ink service engine 214 may receive ink from collectors and store collected ink in the ink database 226. The harvesting service engine 216 may be any executable software code including a kernel component, an application component, a component of a linked library, an object, and so forth.

The harvesting service engine 216 may collect text authored by a user and store the collected text in the harvesting service database 232.

The personalization service engine 210 may be operably coupled to various applications, databases and storage facilities, recognizers, and trainers for recognizers. Included in the databases and storage facilities may be an ink database 226 for storing a user's ink, a trained data database 228 for storing trained data used by a recognizer, a registry 230 for storing operating system and program settings, a harvest service database 232 for storing language information, and disk storage 236 generally used by the computer system. The trainers may include a text trainer 218 for augmenting a recognizer's dictionary using text content and a shape trainer 220 for tuning generic recognizer components using ink data supplied by a user. There may also be one or more trainable recognizers 234. A recognizer may be a trainable recognizer when it has the capability of being trained on a user's data such as ink and text authored by the user. If the recognizer is a trainable recognizer and personalization is turned on, the personalized recognizer is used for recognition of the user's ink input. If the personalization is turned off, the non-personalized recognizer is used.

Among the various applications may be personalization wizard 202, a personalization control panel 204, an ink viewer 206, and other applications 208. The personalization wizard 202 may be an application, a component or other executable code that may provide a graphical user interface for explicitly collecting data from a user and for allowing a user to train a recognizer. The data collected may be a user's ink along with translated text. The data collected may also be a user's words from text authored by the user. The personalization wizard 202 may provide the collected data to the personalization service engine 210 for storage. When a user leaves the personalization wizard 202, this application may make a request to the personalization service engine 210 for training of the recognizer. The personalization service engine 210 may in turn invoke a trainer of each trainable recognizer supporting the language of the collected data.

A user may also explicitly request the training of a recognizer in the personalization control panel 204. The personalization control panel 204 may be an application, a component or other executable code that may provide a graphical user interface to allow a user to turn on or off individual settings of services provided by the personalization service engine 210. For example, the personalization control panel 204 may turn on or off harvesting text authored by a user, implicit personalization, training of recognizers, and personalized recognition. In one embodiment, turning off the training of a recognizer may stop all current and future training of the recognizer but may still allow all collection of ink or text to continue. This advantageously allows the delay of training of a recognizer until explicitly requested. In this embodiment, a user may continue to experience the personalized recognition that was available before training was turned off. By turning training back on, this embodiment may allow training to: continue from the point before training was turned off.

The user may choose to not use the personalized recognizer by turning off personalization using the personalization control panel 204. By turning off personalized recognition, the system may revert back to the default recognizer prior to personalization. In one embodiment, collection of ink or text may continue while personalized recognition is turned off. This embodiment may allow a user to temporarily use a non-personalized recognizer for specific recognition tasks without resetting or stopping personalization. Turning personalized recognition back on in this embodiment may allow the user to experience personalized recognition using a personalized recognizer trained with all the data collected while personalization was turned off. In yet another embodiment, turning off personalization may completely turn off harvesting text, explicit and implicit personalization, training of recognizers, and usage of a personalized recognizer. In this embodiment, the system may revert back to the default recognizer prior to personalization. Collected and trained user data may also be discarded in this embodiment. Turning personalization back on may allow the user to begin personalization from the state of the default recognizer.

An ink viewer 206 may also be included among the various applications coupled to the personalization service engine 210. The ink viewer 206 may be a separate application or a component of the personalization control panel 204. The ink viewer 206 may provide a graphical user interface for a user to control, view, search, delete and edit ink and its associated translation text stored for personalization. The ink viewer 206 may invoke the personalization service interfaces 212 to query of, add, or delete a user's ink and associated data stored in the ink database 226. The ink viewer may thereby provide explicit personalization. Other applications 208 coupled to the personalization service engine 210 may implicitly collect a user's ink whenever the user's ink is recognized. A tablet input panel (TIP) is an example of such an application. A user may input handwriting into a TIP which, in turn, sends it to a recognizer 234 and may also sent it to the personalization service engine 210. Additional information may also be sent to the personalization service engine 210 to provide additional information about the user's ink. For example, the additional information may include a collection time stamp, recognized text, corrected text, language, if an alternate has been chosen, whether the target field was a text field, whether the user has the option to see the recognized text and to correct the text for this ink before it was sent, time stamp when ink was stored, and so forth. Those skilled in the art will appreciate that a user's ink may include other such additional information and may be implicitly collected by other such applications that accept handwriting as input.

Figure 3:
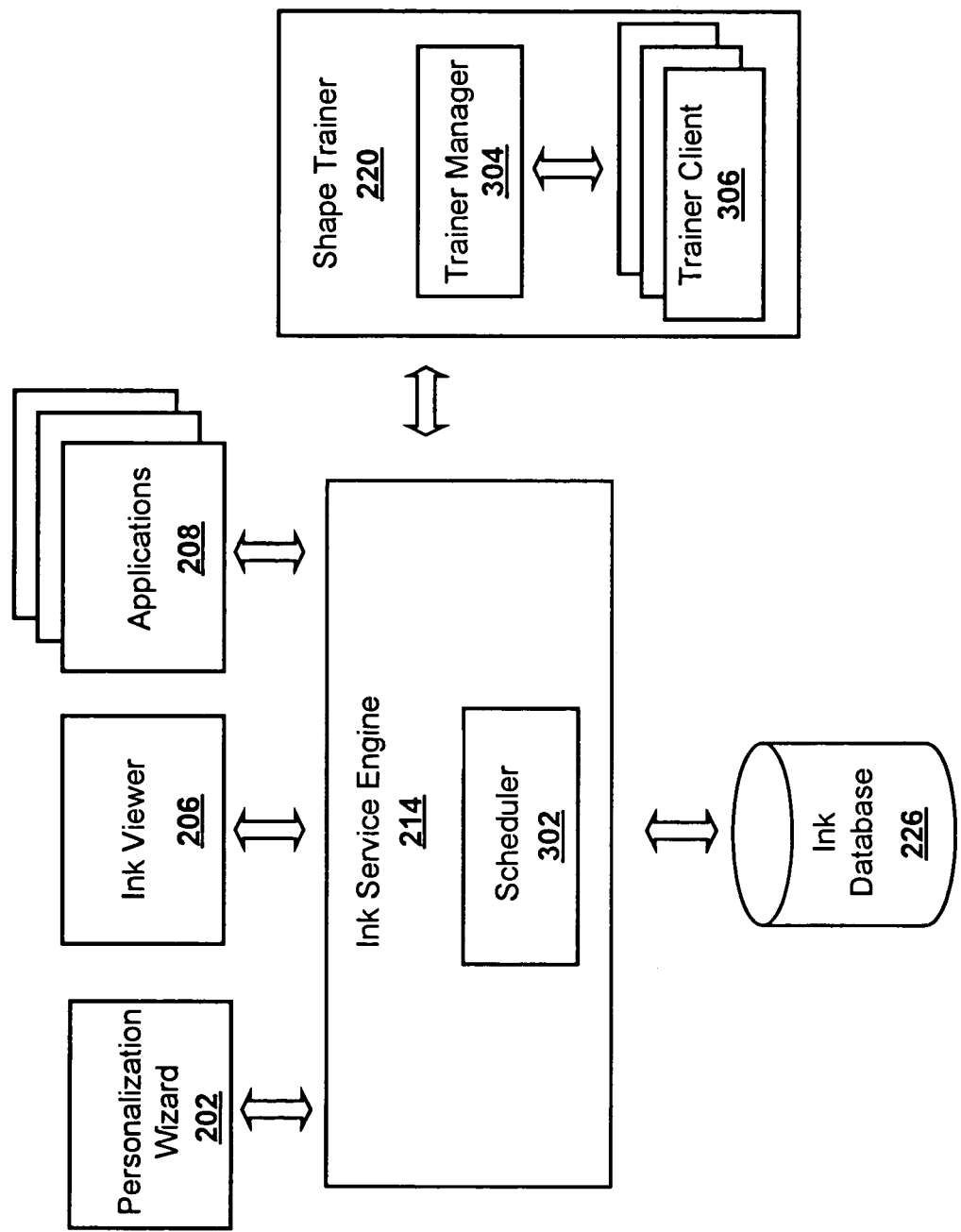
FIG. 3 is a block diagram generally representing an exemplary architecture of system components to collect ink for personalization of handwriting recognition, in accordance with an aspect of the present invention.

FIG. 3 presents a block diagram generally representing an exemplary architecture of system components to collect ink for personalization of handwriting recognition. Those skilled in the art will appreciate that the functionality implemented within the blocks illustrated in the diagram may be implemented as separate components or the functionality of several or all of the blocks may be implemented within a single component. For example, the functionality of the ink viewer 206 may be included in the personalization wizard 202.

The ink service engine 214 may be any executable software code including a kernel component, an application component, a component of a linked library, an object, and so forth. In general, the ink service engine 214 may receive ink from various collectors and store collected ink in the ink database 226. The ink service engine 214 may access the personalization service interfaces 212 such as AddInk to add ink and associated data to the ink database 226. The ink service engine 214 may include a scheduler 302. The scheduler 302 of the ink service engine may schedule training of a recognizer for ink collected. The scheduler may schedule training periodically using a timer, whenever a specified amount of new ink is collected, whenever a specified number of corrections occur, or any other way. In the case of using a timer, the setting for the timer may be created in the registry at the set up time of the trainer to indicate how often training should occur.

Ink may be collected from various applications such as explicitly by the personalization wizard 202 or implicitly by an application 208 that accepts handwriting as input. The ink viewer 206 may additionally provide explicit personalization by editing ink and its associated text that has been stored in the ink database 226. The personalization wizard 202 may collect a user's character shapes or ink by prompting a user to ink lines of text (script) that meets a predefined character distribution. Ink for words that a user may often use and ink for words that are not common language words (i.e. names of people, names of products, company names, acronyms, and abbreviations) may also be collected, explicitly from a user by the personalization wizard 202. The ink database may store additional information with the ink, such as original returned text recognized, corrected text (if available), field input type (text field, drawing field), guide, application type, date and time collected, language type, whether there was an option to correct, whether user verified, etc. Such additional information may be useful in training a recognizer, especially for ink collected without translation text.

The personalization of a recognizer may be performed by a training process that uses the ink collected from a user. The training process to personalize a recognizer is usually specific to an individual recognizer and the training process may or may not be the same for different recognizers. For example, one recognizer may have a different character set or may have different training code from another recognizer. Typically a specific trainer may be provided as a pluggable trainer client 306 for each recognizer. The registry 230 may have personalization settings that map a recognizer with its trainer client 306.

The shape trainer 220 tunes generic recognizer components in a recognizer to ink data supplied by a user. This may make the recognizer more accurate in recognizing how a user writes. The shape trainer 220 may include a trainer manager 304 and one or more pluggable trained clients 306. The shape trainer 220 may expose a Train interface that may be invoked to request a training of the recognizer. The Train interface may enumerate all trainable recognizers available on the user's machine for the current input language and may invoke a trainer client 306 of each trainable recognizer found supporting that language.

There may only be one trainer manager 304. The trainer manager 304 may provide a thin interface layer between each recognizer's trainer client and the ink service engine 214. The trainer manager 304 may set up a connection channel through which a trainer client 306 may talk to the ink service engine 214 (or the personalization service engine 210) in order to enumerate ink and save results.

Each recognizer installed on the system may supply a pluggable trainer client 306 that may be a dynamic linked library or other executable code. During setup of a trainable recognizer, a trainer client may register with the system and settings that map a recognizer with its trainer client 306 may be saved in the registry 230. After the trainer manager 304 establishes a connection channel through which a trainer client 306 may talk, the trainer client 306 may communicate directly with the ink database 226, may enumerate through all available ink, perform manipulations of the ink, and may saves results in the trained data database 228. The internal structure of the results is usually private to the trainer client and its corresponding recognizer. In one embodiment, a trainer client 306 executes in its own process space so that any possible ill behavior may be isolated and cleanup can be easily controlled.

When invoked, a trainer client 306 may decide to train or not based upon the available data. A trainer client 306 may decide not to train if not enough data is available or if the available data fails to meet specific, criteria required for training. If training is performed, a trainer client 306 may store the results of the training in the trained data database 228.

If user shuts down the system or log off during training, the personalization service engine 210 may send a notification to the user indicating that training is taking place and may offer the user to continue training or stop the training. If the user stops the training, the temporary trained data may be deleted. The next time the user logs on, a training notification may be displayed to the user suggesting that the user restart the training from the personalization control panel.

Figure 4:
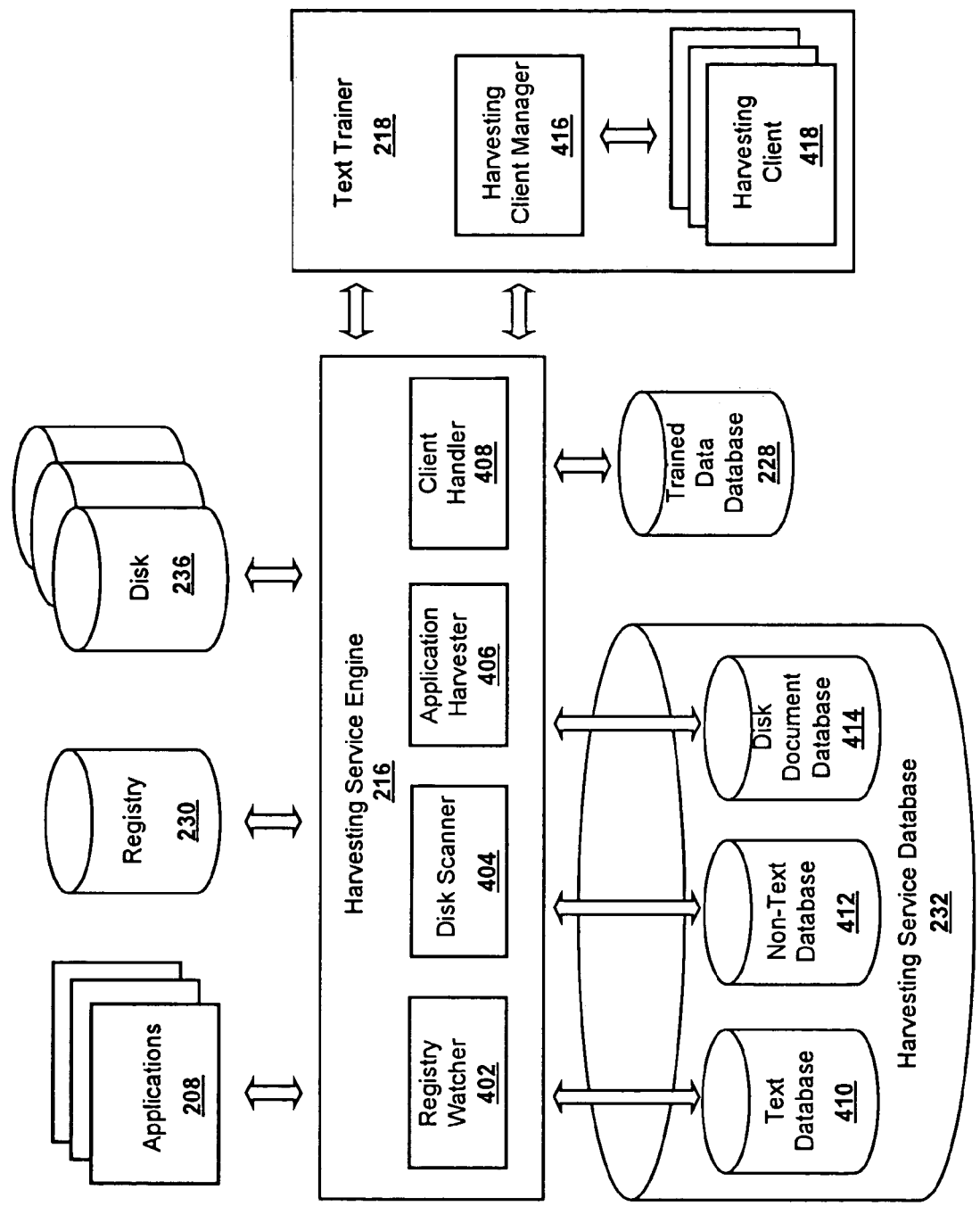
FIG. 4 is a block diagram generally representing an exemplary architecture of system components to harvest text for personalization of handwriting recognition, in accordance with an aspect of the present invention.

FIG. 4 presents a block diagram generally representing an exemplary architecture of system components to harvest text for personalization of handwriting recognition. Those skilled in the art will appreciate that the functionality implemented within the blocks illustrated in the diagram may be implemented as separate components or the functionality of several or all of the blocks may be implemented within a single component. As an example, the functionality of the registry watcher 402 and the functionality of the disk scanner 404 may be implemented in the same component. In general, the harvesting service engine 216 collects words that the user has written that are available on the user's machine and augments a recognizer's dictionary with these words. By so tailoring the language model to the user, the recognizer may be more accurate in recognizing what the user writes. Thus, it is important that harvested documents are authored by the user.

The harvesting service engine 216 may be any executable software code including a kernel component, an application component, a component of a linked library, an object, and so forth. The harvesting service engine 216 may manage an update message queue of update messages about text harvested by applications or components, may update the harvesting service database 232 with the updates, and may then notify harvesting clients 418 of the changes. The harvesting service engine 216 may include a registry watcher 402, a disk scanner 404, an application harvester 406, and a client handler 408. The client handler 408 may be implemented as a dynamic linked library or other executable code and may be used for sending both the most recent changes and access to the harvesting service database 232 to registered harvesting clients. The registry watcher 402 may be implemented as an object and is responsible for watching for changes to various lists in the registry 230. For example, there may be lists, such as a list of Uniform Resource Locators (URLs) or a list of email addresses, used by the operating system shell and an internet browser that are kept in the registry 230. In one embodiment, a separate component may harvest URLs directly from an internet browser. The registry watcher 402 may detect any changes to such lists and may provide those changes to the harvesting service engine 216 for updating the harvesting service database 232. The disk scanner 404 may be implemented as an object and is responsible for harvesting the documents stored on disks 236. In one embodiment, the disk scanner 404 may use an interface such as a file system API like ReadDirectoryChangesW to listen for document updates on disk. In this embodiment, there may be one thread per fixed disk drive on the system and the listening threads may call ReadDirectoryChangesW on the root directory for each fixed drive to be notified of a change in a file on disk. When notified of a change in a file on disk, the listening thread may add an update message to the update message queue and then return to listening. The application harvester 406 may be implemented as an object, dynamic linked library or other executable code and may receive an update message about text updates sent from applications invoking an interface such as the IHarvest interface for sending the update information to the application harvester 406. The IHarvest interface may be an application programming interface (API), an object, a control or other executable code made available by the application harvester 406. As an example, a TIP application may directly send text update information such as a correction to recognized text to the application harvester 406 by invoking the IHarvest interface. This implementation is especially useful for applications such as email which may not store such information locally.

The harvesting of documents may advantageously be user specified or automatic. Automatic harvesting may occur periodically and continue until the entire disk 236 is scanned. User specified harvesting may be implemented using an interface such as an API that takes as input an array of directories to harvest from. The interface may create a thread that will begin harvesting the directories specified by the user. The interface may return to the caller as soon as the thread has been successfully created and harvesting may occur asynchronously to the request.

The harvesting service database 232 may include a text database 410, a non-text database 412 and a disk document database 414. The disk document database 414 may store recently harvested documents and information about the document, referred to herein as input scope, such as the name of the document, the path of its storage location, the application that harvested the document, the language of the document, the date the document was harvested, the time the document was harvested, a count of how many times the document was accessed, an enumeration of the text of the document, and so forth. The enumeration of the text of the document may be stored in a separate file given that it may be variable length data and potentially very large. In one embodiment, a specific number of the most recently used documents harvested are stored. If a new document is harvested in this embodiment that causes the number of documents to exceed the specified number, then the oldest document may be moved to the text database 410 and the new document may be entered into the disk document database 414. The text database 410 may be a repository of all text information that stores all harvested documents and the input scope information about each document, including its enumerated text. In one embodiment, the text database 410 may be a set of records that include the length of text data, the date that the text was harvested and the text for the item. The non-text database 412 may be a repository of all data that is not text. For example, a non-text item may be a URL or an email address. In one embodiment, the non-text database 412 may be a set of records that include the non-text item harvested, the date of last occurrence, and the number of occurrences. In this embodiment, there may be a small file of a specified size which contains the most recent update records and a repository file for all records of non-text items harvested. When the small file becomes full, the repository may be updated with the records of the small file so that updates may occur only periodically.

The harvesting service engine 216 may communicate with a text trainer 218 and a harvesting client manager 416. The text trainer 218 may be implemented as an object, an application, a dynamic linked library or other executable code and may use text content harvested and stored in the harvesting service database 232 to augmenting a recognizer's dictionary. The harvesting client manager 416 may be implemented as an object, an application, dynamic linked library, or other executable code and may provide an interface between the harvesting service engine 216 and the harvesting client 418. In one embodiment, the harvesting client manager 416 may load the harvesting client 418 implemented as a dynamic linked library and may set up a connection channel through which the harvesting client 418 may communicate with the harvesting service engine 216 (or the client handler 408) in order to enumerate harvested information and save results, such as word counts, in the trained data database 228. In general, a harvesting client 418 may typically be code which assists a recognizer by making harvested information from the harvesting service database 232 available to a recognizer to augment its language model. However, those skilled in the art will appreciate that a harvesting client may be used to augment the language model of other applications such as speech, natural language, and so forth. The harvesting client 418 may use an interface such as the IHarvesterDatabase interface to enumerate the harvested information that the harvesting client 418 may desire. The harvesting client 418 may also use an interface such as the ILanguageEnum interface to get harvested information for a particular language type.

Figure 5:
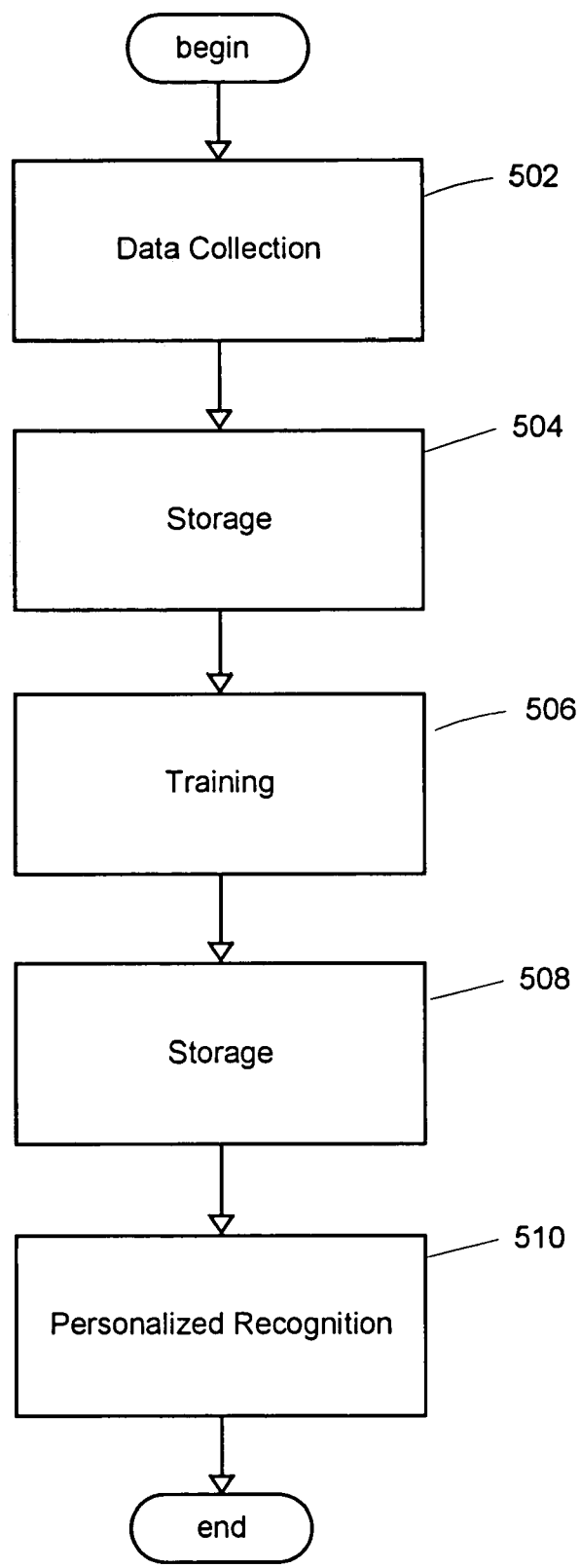
FIG. 5 is a flowchart generally representing example steps undertaken by the system for personalization of handwriting recognition, in accordance with an aspect of the present invention.

FIG. 5 is a flowchart generally representing example steps undertaken by the system for personalization of handwriting recognition. At step 502 data is collected about how the user writes and about what the user writes. The personalization service engine 210 may collect the user's ink and translation text as well as the user's authored text and non-text items. In particular, the ink service engine may collect a user's ink and text translation from a personalization wizard or other application. The ink service engine may also collect a user's ink from an application that accepts handwriting. The harvesting service engine may collect harvested text information from a system registry, disk storage or applications. At step 504 the data collected is stored. The personalization service engine 210 may store the user's ink in the ink database 226 and harvested text in the harvesting service database 232. In particular, the ink service engine may store the ink collected in the ink database 226 and the harvesting service engine 216 may store harvested information in the harvesting service database 232. At step 506, a recognizer is trained. The personalization service engine 210 may invoke a trainer of each trainable recognizer supporting the language of the collected data to perform training. A recognizer may be trained by using a user's ink collected without text translation. Or a recognizer may be trained by using a user's ink collected with text translation. A recognizer may also be trained using the harvested information that has been collected and stored. In particular, a shape trainer may be invoked for training a recognizer using ink collected and stored and a text trainer may be invoked for training the language model of a recognizer using the harvested information collected and stored. At step 508 data from the trainer may be stored and may be made available for a recognizer. At step 510 a personalized recognizer that has been trained using the user's data may be used for handwriting whenever the personalization setting is turned on.

Advantageously, the system and method may personalize a trainable recognizer by using ink written by the user and text authored by the user. By tailoring the recognizer for how a user writes and for what a user writes, a recognizer may be more accurate in recognizing a user's handwriting. The system and method are extensible for any trainable recognizer with a corresponding pluggable trainer. Furthermore, the architecture supports dynamic adaptation of a trainable recognizer as a user writes to the system and authors text. Note that while this architecture has been described for the embodiment of handwriting recognizers, it may be used by other types of recognizers like shape and gesture recognizers.

As can be seen from the foregoing detailed description, the present invention provides an improved system and method for providing personalization of handwriting recognition. The architecture of the present invention provides components and a framework with interfaces for collecting, storing, and accessing user ink and authored information for training recognizers. The system and framework is extensible. It may accept user data from any source including external sources created by the user. It also may be used with any trainable recognizer providing a plugable trainer. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for personalizing handwriting recognition, comprising:
   an ink service engine which receives ink handwritten by a user and stores the ink in an ink database;
   a harvesting service engine which collects text authored by the user and stores the collected text in a harvesting service database, the harvesting service database comprising a text database, a non-text database, and a document database;
   a trained data engine for storing trained data in a trained data database;
   a component having interfaces for personalizing a handwriting recognizer with data authored by the user; and
   a trainer coupled to the component for training the handwriting recognizer with the data authored by the user and the collected ink.

2. The system of claim 1 further comprising an application coupled to the component for receiving the data authored by a user.

3. The system of claim 2 wherein the application comprises a personalization wizard.

4. The system of claim 2 wherein the application comprises an ink viewer.

5. The system of claim 2 wherein the application comprises a text viewer.

6. The system of claim 1 wherein the interfaces comprise an interface for retrieving ink from an ink database.

7. The system of claim 1 wherein the interfaces comprise an interface for storing the collected ink in an ink database.

8. The system of claim 1 wherein the interfaces comprises an interface for retrieving text from a harvesting service database.

9. The system of claim 1 wherein the interfaces comprise an interface for storing text in a harvesting service database.

10. The system of claim 1 wherein the interfaces comprise an interface for enumerating ink stored in an ink database.

11. The system of claim 1 wherein the interfaces comprise an interface for enumerating text stored in a harvesting service database.

12. The system of claim 1 wherein the interfaces comprises an interface for loading trained data from a trained data database.

13. The system of claim 1 wherein the interfaces comprises an interface for requesting training of the handwriting recognizer.

14. The system of claim 1 wherein the interfaces comprise an interface for sending data to the component.

15. The system of claim 1 wherein the data authored by the user comprises text.

16. The system of claim 1 wherein the component comprises an interface for the harvesting service engine.

17. The system of claim 1 wherein the trainer comprises a shape trainer.

18. The system of claim 1 wherein the trainer comprises a text trainer.

19. A method for personalizing handwriting recognition, comprising steps for:
   collecting data authored by a user for personalizing handwriting recognition, the data comprising text authored by the user and context information;
   storing the collected data in a database, the database comprising a text database, a non-text database, and a document database;
   collecting ink handwritten by the user and storing the collected ink in an ink database;
   training a handwriting recognizer using the stored data and collected ink; and
   storing trained data in a trained data database, the trained data being the results of training and the trained data being used by the handwriting recognizer.

20. The method of claim 19 further comprising the step for recognizing handwriting using the trained data.

21. The method of claim 19 wherein the step for collecting data comprises collecting ink and translation text.

22. The method of claim 19 wherein the step for storing the data comprises storing text and input scope.

23. The method of claim 19 wherein the step for storing the data comprises storing an email address.

24. The method of claim 19 wherein the step for storing the data comprises storing a URL.

25. The method of claim 19 wherein the step for training comprises invoking a trainer for each trainable handwriting recognizer supporting the language of the collected data to perform training using the stored data.

26. The method of claim 25 wherein the step for invoking a trainer further comprises loading the trainer.

27. The method of claim 19 wherein the step for training comprises updating a language model of the handwriting recognizer during recognition.

28. The method of claim 19 wherein the step for training a handwriting recognizer using the stored data comprises training multiple handwriting recognizers using the stored data.

29. A computer-readable storage medium having stored computer-executable instructions for performing the method of claim 19.

* * * * *